United States Patent
Liu et al.

(10) Patent No.: US 8,412,093 B2
(45) Date of Patent: Apr. 2, 2013

(54) RECEIVER APPLYING CHANNEL SELECTION FILTER FOR RECEIVING SATELLITE SIGNAL AND RECEIVING METHOD THEREOF

(75) Inventors: Chieh-Chao Liu, Hsinchu (TW); Cheng-Yi Ou-Yang, Hsinchu County (TW); Pao-Lin Wu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 497 days.

(21) Appl. No.: 12/256,464

(22) Filed: Oct. 22, 2008

(65) Prior Publication Data
US 2010/0099351 A1    Apr. 22, 2010

(51) Int. Cl.
*H04H 20/74* (2008.01)
(52) U.S. Cl. ........ 455/3.02; 375/147; 375/148; 375/316
(58) Field of Classification Search .................. 455/3.02
See application file for complete search history.

(56) References Cited

U.S. PATENT DOCUMENTS

| | | | | |
|---|---|---|---|---|
| 3,623,098 A * | 11/1971 | Jones et al. | ...................... | 342/91 |
| 4,758,959 A * | 7/1988 | Thoone et al. | ................. | 701/472 |
| 5,594,454 A * | 1/1997 | Devereux et al. | ...... | 342/357.395 |
| 5,615,409 A * | 3/1997 | Forssen et al. | ................. | 455/440 |
| 5,890,068 A * | 3/1999 | Fattouche et al. | .......... | 455/456.2 |
| 5,923,287 A * | 7/1999 | Lennen | .................... | 342/357.73 |
| 6,321,158 B1 * | 11/2001 | DeLorme et al. | .............. | 701/426 |
| 6,353,743 B1 * | 3/2002 | Karmel | ........................ | 455/456.5 |
| 6,363,123 B1 * | 3/2002 | Balodis | ........................... | 375/316 |
| 6,448,926 B1 * | 9/2002 | Weinberg et al. | ......... | 342/357.73 |
| 6,577,953 B1 * | 6/2003 | Swope et al. | ................. | 701/472 |
| 6,580,910 B1 * | 6/2003 | Mazur et al. | ................... | 455/440 |
| 6,587,441 B1 * | 7/2003 | Urban et al. | ................... | 370/310 |
| 6,594,580 B1 * | 7/2003 | Tada et al. | ...................... | 701/532 |
| 6,628,969 B1 * | 9/2003 | Rilling | ........................... | 455/561 |
| 6,639,541 B1 * | 10/2003 | Quintana et al. | ................ | 342/18 |
| 6,650,910 B1 * | 11/2003 | Mazur et al. | ................ | 455/562.1 |
| 6,710,578 B1 * | 3/2004 | Sklovsky | ....................... | 320/127 |
| 6,720,915 B2 * | 4/2004 | Sheynblat | ................ | 342/357.67 |
| 6,727,850 B2 * | 4/2004 | Park et al. | ................. | 342/357.25 |
| 6,754,583 B2 * | 6/2004 | Verbil | .............. | 701/454 |
| 6,754,584 B2 * | 6/2004 | Pinto et al. | ..................... | 701/470 |
| 6,760,364 B2 * | 7/2004 | Kohli et al. | ..................... | 375/150 |
| 6,791,995 B1 * | 9/2004 | Azenkot et al. | ............... | 370/436 |
| 6,798,850 B1 * | 9/2004 | Wedin et al. | .................. | 375/340 |
| 6,806,463 B2 * | 10/2004 | Miller et al. | .................. | 250/286 |

(Continued)

FOREIGN PATENT DOCUMENTS

EP    1 052 786 A1    11/2000

OTHER PUBLICATIONS

[G. Heinrichs, J. Winkel, Ch. Drewes, L. Maurer, A. Springer, R. Stuhlberger, and Ch. Wicpalek], [System Considerations for a Combined UMTS/GNSS Receiver], [Mar. 22-22, 2007], [pp. 189-198], [IEEE], [Hannover, Germany].

*Primary Examiner* — Hai Nguyen
(74) *Attorney, Agent, or Firm* — Winston Hsu; Scott Margo

(57) ABSTRACT

A satellite receiver for receiving at least a target satellite signal includes a channel selection filter and a controller. The channel selection filter is provided with a plurality of channel selection settings conforming to characteristics of a plurality of satellite signals corresponding to different satellite systems, wherein each of the channel selection settings is to receive at least one of the satellite signals. The controller controls the channel selection filter to enable a target channel selection setting selected from the channel selection settings to thereby receive at least the target satellite signal.

16 Claims, 3 Drawing Sheets

U.S. PATENT DOCUMENTS

| | | | | |
|---|---|---|---|---|
| 6,961,368 B2* | 11/2005 | Dent et al. | | 375/219 |
| 6,967,992 B1* | 11/2005 | Rabaeijs et al. | | 375/150 |
| 7,010,060 B2* | 3/2006 | Ledvina et al. | | 375/316 |
| 7,092,433 B2 | 8/2006 | Oesch et al. | | 375/148 |
| 7,250,904 B2* | 7/2007 | King et al. | | 342/357.67 |
| 7,286,592 B2* | 10/2007 | Pietila et al. | | 375/147 |
| 7,305,021 B2* | 12/2007 | Ledvina et al. | | 375/137 |
| 7,359,706 B2* | 4/2008 | Zhao | | 455/436 |
| 7,362,795 B1 | 4/2008 | Lennen | | 375/149 |
| 7,372,400 B2* | 5/2008 | Cohen et al. | | 342/357.29 |
| 7,440,427 B1* | 10/2008 | Katz | | 370/321 |
| 7,447,189 B2* | 11/2008 | Jou | | 370/342 |
| 7,460,871 B2* | 12/2008 | Humphries et al. | | 455/456.1 |
| 7,463,874 B2* | 12/2008 | Kang et al. | | 455/285 |
| 7,479,924 B2* | 1/2009 | Jia et al. | | 342/357.63 |
| 7,495,607 B1* | 2/2009 | Zhodzishsky et al. | | 342/357.31 |
| 7,564,406 B2* | 7/2009 | Han | | 342/357.66 |
| 7,680,078 B2* | 3/2010 | Shulman | | 370/329 |
| 7,750,848 B2* | 7/2010 | Normark et al. | | 342/357.25 |
| 7,792,481 B2* | 9/2010 | Dederer | | 455/3.02 |
| 7,822,105 B2* | 10/2010 | Underbrink et al. | | 375/148 |
| 7,860,145 B2* | 12/2010 | Knight et al. | | 375/130 |
| 7,864,109 B2* | 1/2011 | Normark et al. | | 342/357.74 |
| 7,864,898 B2* | 1/2011 | Jia | | 375/343 |
| 7,876,259 B2* | 1/2011 | Schuchman | | 342/37 |
| 7,903,026 B2* | 3/2011 | Kobayashi | | 342/357.72 |
| 7,928,902 B2* | 4/2011 | Nagahara | | 342/357.23 |
| 7,990,315 B2* | 8/2011 | Chen et al. | | 342/357.73 |
| 8,090,006 B2* | 1/2012 | Narayan et al. | | 375/148 |
| 8,098,716 B2* | 1/2012 | Goldberg et al. | | 375/150 |
| 8,135,094 B2* | 3/2012 | Gorday | | 375/332 |
| 8,139,685 B2* | 3/2012 | Simic et al. | | 375/324 |
| 8,144,054 B2* | 3/2012 | Geswender et al. | | 342/357.59 |
| 8,232,918 B2* | 7/2012 | Chang | | 342/368 |
| 8,275,323 B1* | 9/2012 | Shirali et al. | | 455/67.11 |
| 2001/0048387 A1* | 12/2001 | Sheynblat | | 342/357.09 |
| 2002/0012387 A1* | 1/2002 | Shakeri et al. | | 375/150 |
| 2002/0012411 A1* | 1/2002 | Heinzl et al. | | 375/350 |
| 2002/0075945 A1* | 6/2002 | Farine et al. | | 375/148 |
| 2002/0090025 A1* | 7/2002 | Kober et al. | | 375/148 |
| 2002/0167995 A1* | 11/2002 | Oesch et al. | | 375/150 |
| 2002/0175857 A1* | 11/2002 | Abraham | | 342/357.12 |
| 2003/0072356 A1* | 4/2003 | Abraham et al. | | 375/148 |
| 2004/0043794 A1* | 3/2004 | Nakaya et al. | | 455/561 |
| 2004/0136445 A1* | 7/2004 | Olson et al. | | 375/148 |
| 2004/0146093 A1* | 7/2004 | Olson et al. | | 375/148 |
| 2004/0257275 A1* | 12/2004 | Yee et al. | | 342/357.02 |
| 2005/0018795 A1* | 1/2005 | Studenny et al. | | 375/343 |
| 2005/0080561 A1 | 4/2005 | Abraham | | |
| 2005/0090213 A1* | 4/2005 | Heng et al. | | 455/154.1 |
| 2005/0140545 A1* | 6/2005 | Subbarao et al. | | 342/357.12 |
| 2005/0185700 A1* | 8/2005 | Pietila et al. | | 375/147 |
| 2006/0098721 A1* | 5/2006 | Rabaeijs et al. | | 375/150 |
| 2006/0140254 A1* | 6/2006 | Pietila et al. | | 375/147 |
| 2006/0238418 A1* | 10/2006 | Monnerat et al. | | 342/357.09 |
| 2006/0274822 A1* | 12/2006 | Stahlberg et al. | | 375/150 |
| 2006/0282579 A1* | 12/2006 | Dederer | | 710/62 |
| 2007/0112479 A1* | 5/2007 | Wright et al. | | 701/3 |
| 2007/0183483 A1* | 8/2007 | Narayan et al. | | 375/148 |
| 2007/0258511 A1* | 11/2007 | Knight et al. | | 375/149 |
| 2007/0268960 A1* | 11/2007 | Jia | | 375/147 |
| 2007/0274374 A1* | 11/2007 | Abraham | | 375/148 |
| 2008/0013604 A1* | 1/2008 | Chen | | 375/149 |
| 2008/0037687 A1* | 2/2008 | Li et al. | | 375/316 |
| 2008/0071995 A1* | 3/2008 | Chen et al. | | 711/147 |
| 2008/0112469 A1* | 5/2008 | Goldberg et al. | | 375/150 |
| 2008/0219389 A1* | 9/2008 | Nisbet | | 375/348 |
| 2008/0240315 A1* | 10/2008 | De Mey et al. | | 375/350 |
| 2008/0291979 A1* | 11/2008 | Normark et al. | | 375/147 |
| 2009/0002234 A1* | 1/2009 | Normark et al. | | 342/357.15 |
| 2009/0058705 A1* | 3/2009 | Cetin et al. | | 341/155 |
| 2009/0079626 A1* | 3/2009 | Kobayashi | | 342/357.12 |
| 2009/0106535 A1* | 4/2009 | Chen et al. | | 712/220 |
| 2009/0111395 A1* | 4/2009 | Jiang et al. | | 455/103 |
| 2009/0147833 A1* | 6/2009 | Pietila et al. | | 375/147 |
| 2009/0168843 A1* | 7/2009 | Waters et al. | | 375/130 |
| 2009/0285268 A1* | 11/2009 | Gildea et al. | | 375/149 |
| 2009/0295632 A1* | 12/2009 | Simic et al. | | 342/357.12 |
| 2010/0007554 A1* | 1/2010 | Wang et al. | | 342/357.12 |
| 2010/0007555 A1* | 1/2010 | Ezal et al. | | 342/357.12 |
| 2010/0061426 A1* | 3/2010 | Eerola | | 375/142 |
| 2010/0073229 A1* | 3/2010 | Pattabiraman et al. | | 342/357.09 |
| 2010/0098136 A1* | 4/2010 | Abraham et al. | | 375/148 |
| 2010/0099351 A1* | 4/2010 | Liu et al. | | 455/3.02 |
| 2010/0284495 A1* | 11/2010 | Segal et al. | | 375/316 |
| 2011/0068958 A1* | 3/2011 | Knight et al. | | 341/51 |

* cited by examiner

RECEIVER APPLYING CHANNEL SELECTION FILTER FOR RECEIVING SATELLITE SIGNAL AND RECEIVING METHOD THEREOF

BACKGROUND

The present invention relates to a satellite receiver, and more particularly, to a satellite receiver applying a channel selection filter and a receiving method thereof.

The Global Positioning System (GPS) utilizes a satellite constellation of at least 24 electronic satellites to enable a GPS receiver to determine its location, speed, direction, and time, and has become widely used tool for map-making, land-surveying, commerce, and scientific applications. Although GPS is the most popular navigation system, there are other recently developed navigation systems, such as the GLONASS built by Russia, GALILEO built by the European Union, BEIDOU built by China, and IRNSS built by India, all of which provide similar services to the GPS.

As a navigation satellite receiver calculates its position by measuring the distance between itself and satellites, it is expected that the positioning precision will improve when the number of satellites referred to by the navigation satellite receiver increases. Manufacturers have researched dual mode (GPS/GALILEO) receivers benefiting greatly from available GPS and GALILEO satellites. GPS and Galileo use the same frequency band L1 at the center frequency of 1575.42 MHz, so it is possible to use one radio that operates with both systems (i.e. a GPS/Galileo dual mode radio). Slight differences in signal acquisition, however, will need to be implemented in a configurable fashion. Specifically, Galileo signals use a 4 MHz bandwidth, compared with 2 MHz for GPS, and will implement a different coding scheme. Moreover, the conventional dual mode receivers cannot effectively avoid the GALILEO signals having wider bandwidth than the GPS signals from suffering near-band jamming, so the positioning and navigation performances of the dual mode receivers become ineffective.

SUMMARY

According to an exemplary embodiment of the present invention, an apparatus for receiving at least a target satellite signal is disclosed. The apparatus comprises a channel selection filter and a controller. The channel selection filter comprises a plurality of channel selection settings conforming to characteristics of a plurality of satellite signals corresponding to different satellite systems, wherein each of the channel selection settings is to receive at least one of the satellite signals. The controller controls the channel selection filter to enable a target channel selection setting selected from the channel selection settings.

According to another exemplary embodiment of the present invention, a method of receiving at least a target satellite signal is disclosed. The method comprises providing a plurality of channel selection settings conforming to characteristics of a plurality of satellite signals corresponding to different satellite systems, and enabling a target channel selection setting selected from the channel selection settings to thereby receive at least the target satellite signal. Each of the channel selection settings is to receive at least one of the satellite signals.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
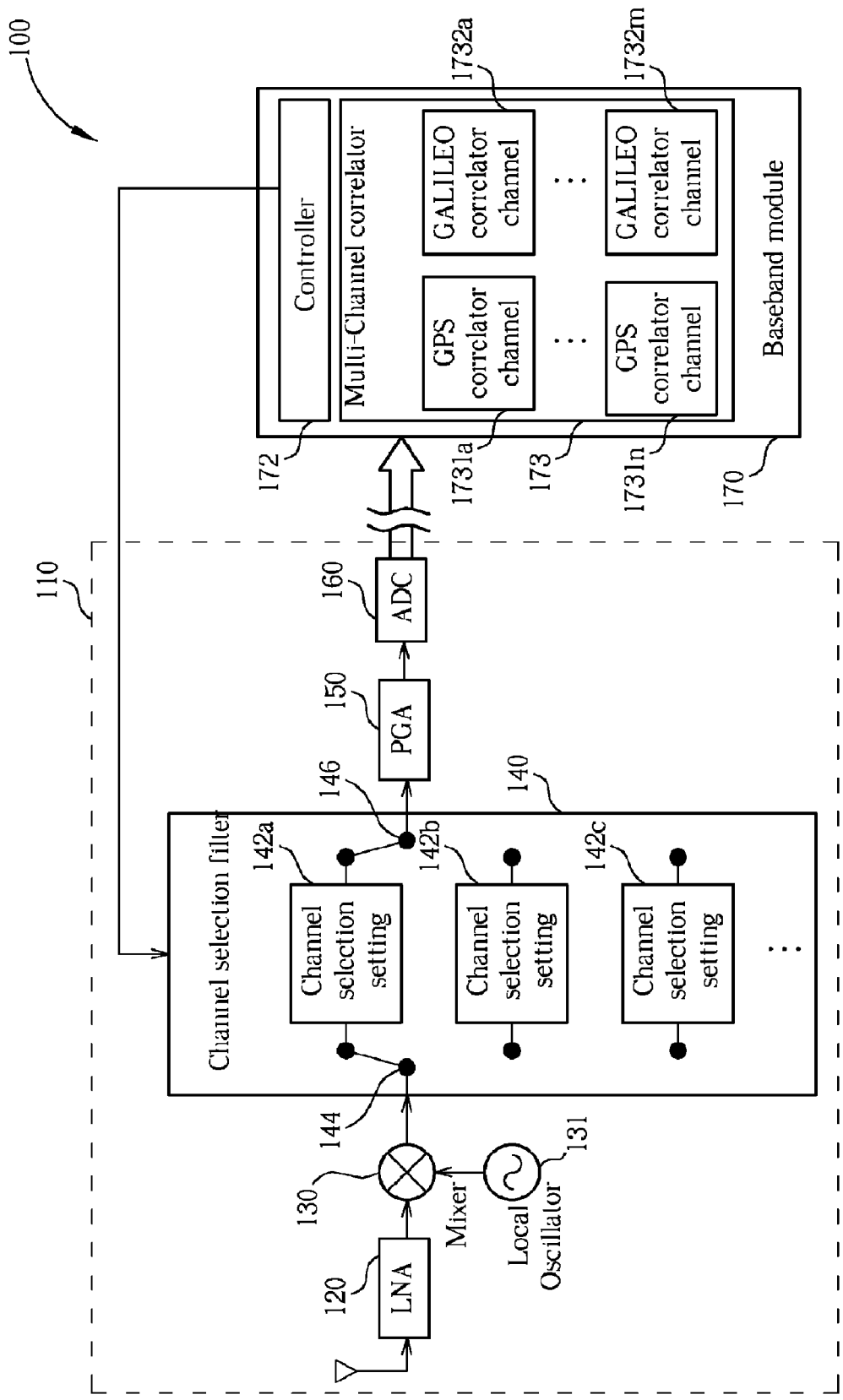
FIG. 1 shows a diagram of a satellite receiver according to an exemplary embodiment of the present invention.

Please refer to FIG. 1, which shows a diagram of a satellite receiver 100 according to an exemplary embodiment of the present invention. Note that only components pertinent to technical features of the present invention are shown in FIG. 1. Therefore, only an RF front-end module 110 including a low noise amplifier (LNA) 120, a mixer 130, a local oscillator 131, a channel selection filter 140, a programmable gain amplifier (PGA) 150 and an analog-to-digital converter (ADC) 160, and a baseband module 170 including a multi-channel correlator 173 and a controller 172 are shown, while well-known components of the satellite receiver 100 in the baseband module 170, and well-known components between the RF front-end module 110 and the baseband module 170 are omitted for brevity. The satellite receiver 100 utilizes the RF front-end module 110 to receive at least a target satellite signal from a plurality of satellite signals corresponding to different satellite systems (e.g., the GPS system, the GLONASS system, the GALILEO system, the BEIDOU system, and the IRNSS system), and the operation of the RF front-end module 110 is described in the following paragraphs.

The received satellite signals pass through the LNA 120 and are converted to an intermediate frequency (IF) band by the mixer 130. The IF signals are then filtered by the channel selection filter 140 in order to filter out undesired signals to retrieve the satellite signal. The channel selection filter 140 is provided with a plurality of channel selection settings (e.g. 142a-142c) conforming to characteristics of different satellite signals. For example, each channel selection setting determines a bandwidth and a central frequency of a band-pass filter. Each of the channel selection settings 142a-142c is to receive at least one of the satellite signals. In other words, the channel selection settings 142a-142c may simultaneously conform to characteristics of more than one kind of satellite signal. For example, the channel selection setting 142c may be designed to receive the GPS signal; the channel selection setting 142a may be designed to receive both the GPS signal and the GALILEO signal. The selection of which channel selection setting is being utilized is controlled by the controller 172 in the baseband module 170, and the selection principle will be described later. By having a plurality of candidate settings such as 142a-142c and adaptively selecting a target channel selection setting from the candidate settings 142a-142c, the satellite receiver 100 actualizes a multi-mode receiver.

Although only three channel selection settings 142a-142c are drawn in FIG. 1, in practice, the number of the channel selection settings is not limited in the present invention. The target satellite signal output from the channel selection filter 140 is then processed by the PGA 150 and the ADC 160, and is converted to the baseband. Since these processes are familiar to those skilled in the art, further description is omitted for brevity. In the baseband module 170, the correlator 173 tracks the satellite signal and determines signal quality of the received satellite signals, and the controller 172 adaptively selects the target channel selection setting from the candidate settings such as 142a-142c according to the signal quality. For example, a channel selection setting conforming to characteristics of a satellite signal having better signal quality is selected.

Figure 2:
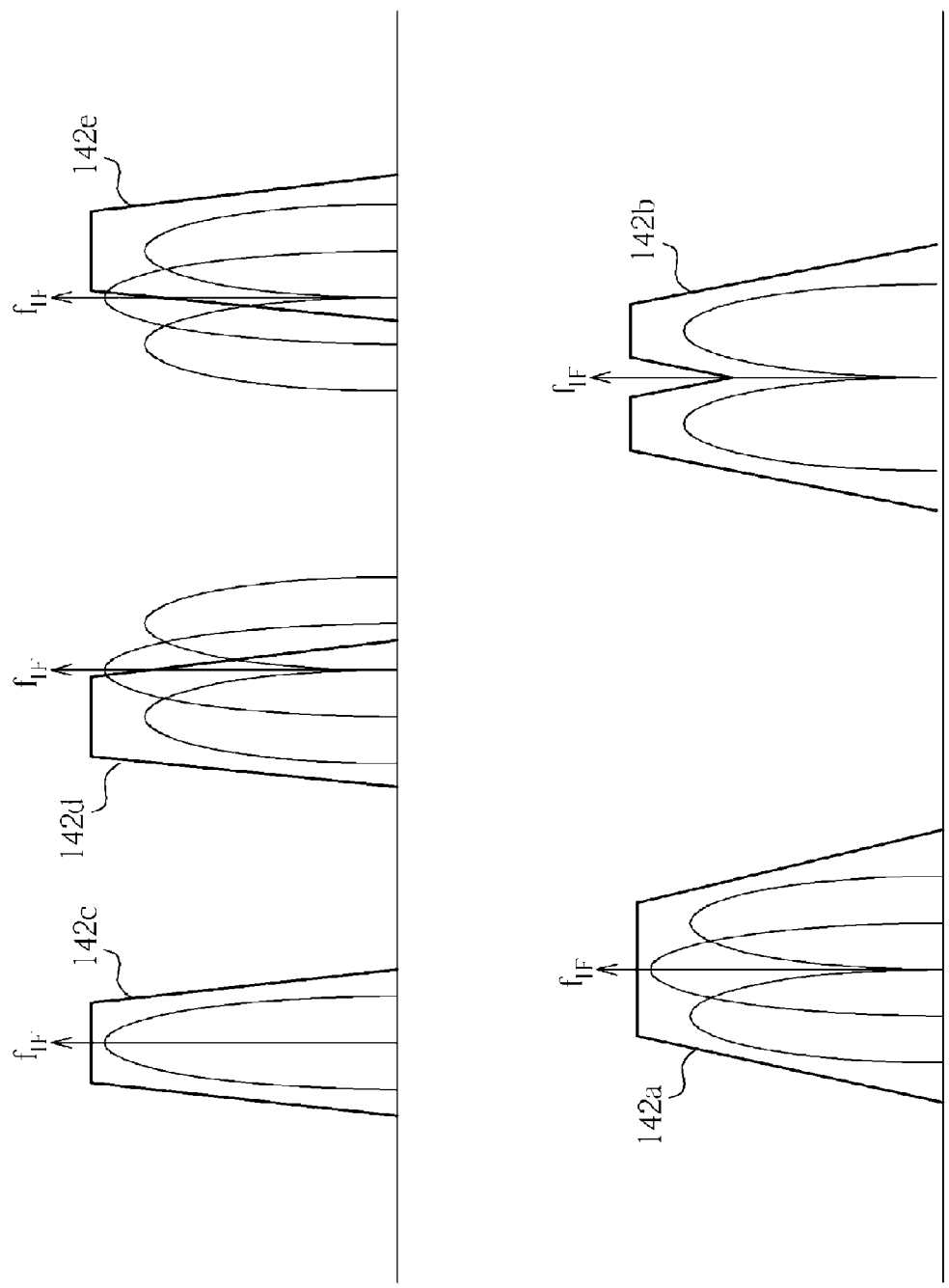
FIG. 2 shows diagrams of channel selection settings conforming to the GPS signal or/and the GALILEO signal according to an exemplary embodiment of the present invention.

In order to better understand the operations of the satellite receiver 100, the GPS signal and the GALILEO signal are taken as examples of the target signal in the following, and the satellite receiver 100 is configured to be a dual mode GNSS receiver for receiving the GPS signal and the GALILEO signal. The GPS L1 band signal and the GALILEO L1 band signal both have a central frequency at 1575.42 MHz, and their bandwidths overlap. FIG. 2 shows diagrams of channel selection settings 142a-142e conforming to the 2 MHz bandwidth GPS signal or/and the 4 MHz bandwidth GALILEO signal according to an exemplary embodiment of the present invention. The channel selection setting 142a can let both the GPS signal and the GALILEO signal pass through the channel selection filter 140; conversely, the channel selection setting 142b only lets the GALILEO signal pass through, and the channel selection setting 142c only lets the GPS signal pass through. The channel selection setting 142b can be obtained from combing the band-pass filter of the channel selection setting 142a with a notch filter having a stop-band around the central frequency. The channel selection settings 142d and 142e only allow a low lobe and a high lobe of the GALILEO signal to pass through respectively.

The band-pass filters of the channel selection settings 142c-142e can be derived from a same band-pass filter with the central frequency of the band-pass filter shifted to the central frequencies of the GPS signal, the low lobe of the GALILEO signal, and the high lobe of the GALILEO signal. When implemented, the channel selection settings 142c-142e can be integrated into a filter hardware whose central frequency is adjustable, and the controller 172 configures the central frequency of the filter to generate a substantially same effect of the channel selection setting 142c, 142d, or 142e. It should be noted that the channel selection settings 142a-142e are for illustrative purposes only, and not meant to be limitations of the present invention.

Figure 3:
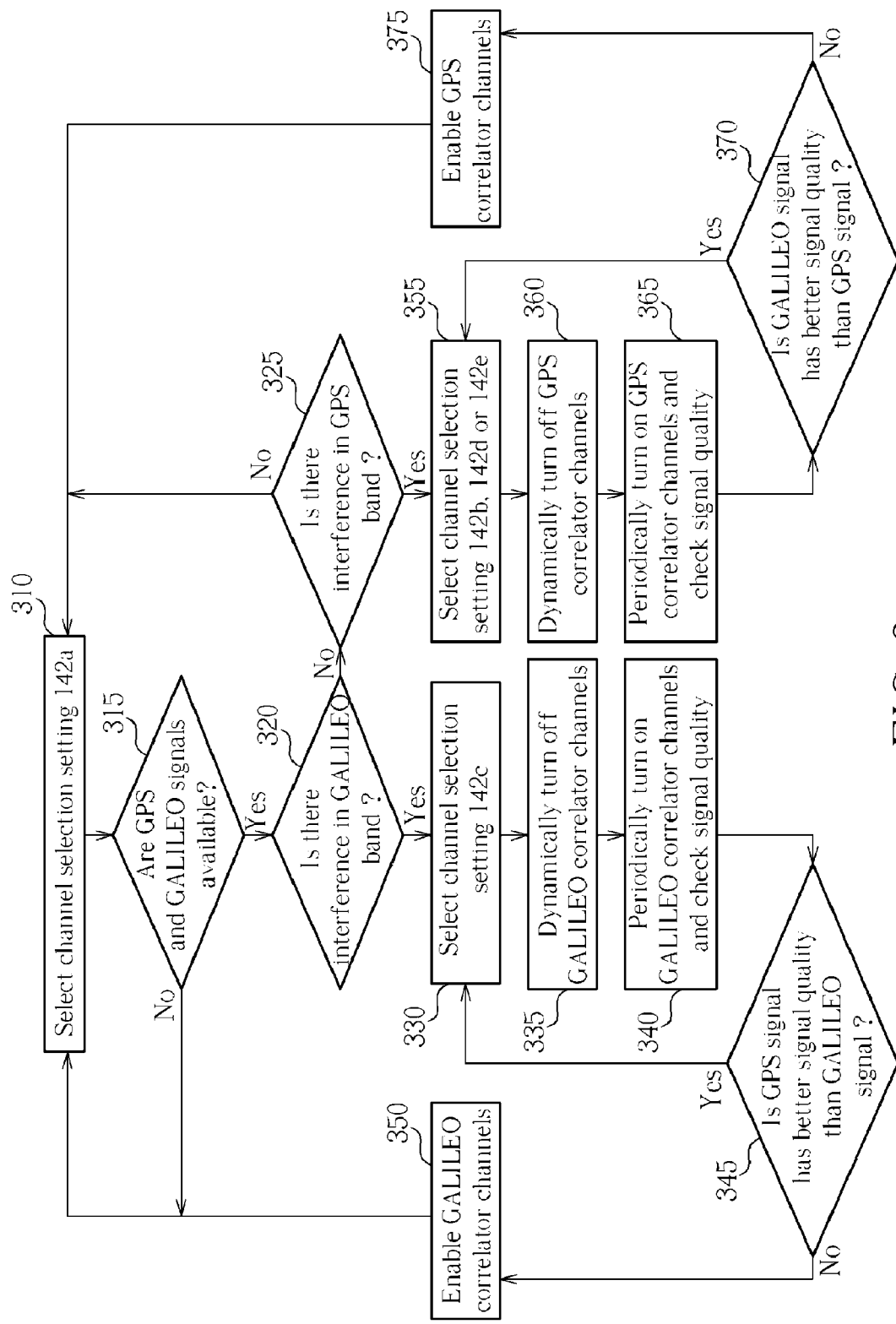
FIG. 3 is a flowchart of a controlling process of the controller shown in FIG. 1 according to an exemplary embodiment of the present invention.

Please refer to FIG. 3 in conjunction with FIG. 1 and FIG. 2. FIG. 3 is a flowchart illustrating the controlling process of the controller 172 according to an exemplary embodiment of the present invention. When the satellite receiver 100 is started, the controller 172 first selects the channel selection setting 142a to receive both the GPS and GALILEO signals from the IF signals (Step 310), and checks whether the GPS and GALILEO signals are available by post FFT or another DSP method (Step 315). If the GPS and GALILEO signals are not available (for example, the satellite receiver 100 is disposed in a position where the GPS and GALILEO systems cannot cover), the following steps are not performed until they are available. In other conditions, the controller 172 determines the signal quality of the received GPS and GALILEO signals. In this embodiment, the GALILEO band is checked in order to see if there is interference (Step 320), and the GPS band may be checked as well (Step 325). When both signal quality of the GALILEO signal and the GPS signal are acceptable (e.g., there is no interference in the GPS band nor in the GALILEO band), the process returns to Step 310, enabling the satellite receiver 100 to use information in the GPS and GALILEO signals. In this situation, the GPS correlator channels 1731a-1731n and the GALILEO correlator channels 1732a-1732m in the multi-channel correlator 173 of the baseband module 170 are both enabled for respectively processing the GPS signal and the GALILEO signal.

However, when there is interference in the GALILEO band, the controller 172 selects the channel selection setting 142c, which receives the GPS signal only (Step 330). In this way, the interference is excluded, and the satellite receiver 100 utilizes information in the GPS signal for positioning. The performance of the satellite receiver 100 is maintained, while received noise is decreased and jamming immunity is improved. Moreover, the GALILEO correlator channels 1732a-1732m can be dynamically turned off in Step 335. One further advantage of Step 335 is power saving. In Step 340, the GALILEO correlator channels 1732a-1732m are turned on again to check the signal quality of the GALILEO signal. If the signal quality of the GALILEO signal becomes acceptable (better than or equal to that of the GPS signal in this embodiment) or the interference previously existing in the GALILEO band disappears or fades, the process moves from Step 345 to Step 350, re-enabling the GALILEO correlator channels 1732a-1732m. The channel selection setting 142a is utilized to receive the GPS signal and the GALILEO signal again since the signal quality of these two signals is fine. Otherwise, the process returns to Step 330 to continue using the channel selection setting 142c in the channel selection filter 140. In one embodiment, the signal quality is determined by computing the signal-to-noise ratio of the signal.

Please note that the satellite receiver 100 is not limited to have two or more correlator channels for processing the GPS and the GALILEO signals, respectively. There can be only one correlator channel in the baseband module 170. In one embodiment, the correlator channel includes a GPS code and a GALILEO code, utilizes the GPS code to decode the GPS signal in a time slot, and utilizes the GALILEO code to decode the GALILEO signal in another time slot. In this situation, Step 335 is modified to dynamically stop the decoding of the GALILEO signal, Step 340 is modified to periodically recover the decoding of the GALILEO signal and check the signal quality, and Step 350 is modified to enable the decoding of the GALILEO signal.

On the other hand, when the checking result of Step 325 indicates that there is interference in the GPS band, the controller 172 selects one of the channel selection settings 142b, 142d and 142e (Step 335) according to the frequency of the interference. When the frequency of the interference is around the central frequency of the GALILEO signal, the controller 172 selects the channel selection filter 142b to reject the interference while keeping most of the GALILEO signal. In this way, the interference is suppressed, and the satellite receiver 100 utilizes information in the GALILEO signal for positioning. The channel selection setting 142d will be selected in Step 355 when the frequency of the interference is in the high lobe band of the GALILEO signal, and the channel selection setting 142e will be selected when the frequency of the interference is in the low lobe band of the GALILEO signal. Although the information that the satellite receiver 100 can get is reduced (only one lobe of the GALILEO signal is received), resulting in a minor degradation in performance, the interference can be suppressed and better jamming immunity can be obtained. Note that the GPS signal received by the channel selection setting 142d or 142e is not complete, and GPS signal has different coding scheme from Galileo signal, therefore the GPS signal will not effect the decoding of the GALILEO signal.

Similarly, the GPS correlator channels 1731a-1731n can be dynamically turned off in Step 360, and turned on again to check the signal quality of the GPS signal in Step 365. When the signal quality of the GPS signal becomes acceptable, the process moves from Step 370 to Step 375, enabling the GPS correlator channels 1731a-1731n. Meanwhile, the channel selection setting 142a is utilized to receive the GPS signal and the GALILEO signal again (Step 310). Otherwise, the process returns to Step 355 to receive the GALILEO signal only.

Since the satellite receiver 100 is not limited to have two or more correlator channels for processing the GPS and the GALILEO signals, Steps 360, 365 and 375 can be modified to dynamically stop decoding the GPS signal, periodically recover the decoding of the GPS signal and check the signal quality, and enable the decoding of the GPS signal, respectively.

Moreover, provided that substantially the same result is achieved, the steps in FIG. 3 need not be in the exact order shown and need not be contiguous; that is, other steps can be intermediate. The process mentioned above is not limited in processing the GPS signal and the GALILEO signal, or limited in processing signals in the 1575.42 MHz band. As long as two or more satellite signals have overlapping bandwidth, the satellite receiver 100 can be utilized to separately process the satellite signals. Since the satellite signals have close central frequencies, one front-end module 110 is sufficient to convert the satellite signals to the intermediate frequency band and the baseband.

To conclude, the satellite receiver 100 receives and processes satellite signals whose bandwidths overlap, by a single front-end hardware 110. With an adaptive channel selection filter 140 supporting different GNSS requirements and providing auto-calibrated and configurable filter settings, the satellite receiver 100 obtains better jamming immunity than the receivers in the prior arts.

Those skilled in the art will readily observe that numerous modifications and alterations of the device and method may be made while retaining the teachings of the invention.

What is claimed is:

1. An apparatus for receiving at least a target satellite signal, comprising:
    a channel selection filter of an RF front-end module, comprising a plurality of channel selection settings conforming to characteristics of a plurality of satellite signals corresponding to different satellite systems, wherein each of the channel selection settings is for receiving at least one of the satellite signals; and
    a controller, coupled to the channel selection filter, for controlling the channel selection filter to enable a target channel selection setting selected from the channel selection settings to thereby receive at least the target satellite signal.

2. The apparatus of claim 1, wherein the bandwidths of the plurality of satellite signals are overlapped.

3. The apparatus of claim 1, wherein the controller determines signal qualities of the satellite signals, and controls the channel selection filter to enable the target channel selection setting according to the signal qualities of the satellite signals.

4. The apparatus of claim 1, wherein the channel selection settings are configured the channel selection filter to have an identical pass band but different central frequencies.

5. The apparatus of claim 1, further comprising:
    a plurality of correlator channels, coupled to the channel selection filter and the controller, for processing the satellite signals respectively;
    wherein the controller further turns off at least one correlator channel not corresponding to the target satellite signal.

6. The apparatus of claim 5, wherein the controller further turns on the correlator channels after the correlator channels are turned off, determines signal qualities of the satellite signals, and then selectively changes the target channel selection setting according to the signal qualities.

7. The apparatus of claim 6, wherein the controller turns on and turns off the correlator channels alternately until the target channel selection setting is changed.

8. The apparatus of claim 1, wherein the target satellite signal includes a plurality of lobes; and the controller further determines signal qualities of the lobes, and controls the channel selection filter to enable the target channel selection setting for selecting one of the lobes according to the signal qualities of the lobes.

9. A method of receiving at least a target satellite signal, comprising:
    providing a plurality of channel selection settings conforming to characteristics of a plurality of satellite signals corresponding to different satellite systems, wherein the plurality of channel selection settings are used to setting a channel selection filter of an RF front-end module, and each of the channel selection settings is for receiving at least one of the satellite signals; and
    enabling a target channel selection setting selected from the channel selection settings to thereby receive at least the target satellite signal.

10. The method of claim 9, wherein the bandwidths of the plurality of satellite signals are overlapped.

11. The method of claim 9, wherein the step of enabling a target channel selection setting comprises determining signal qualities of the satellite signals, and enabling the target channel selection setting according to the signal qualities of the satellite signals.

12. The method of claim 9, wherein the channel selection settings are further configured to change central frequencies.

13. The method of claim 9, further comprising:
    correlating the satellite signals by a plurality of correlator channels respectively;
    wherein the method further comprises turning off at least one correlator channels not corresponding to the target satellite signal.

14. The method of claim 13, further comprising turning on the correlator channels after the correlator channels are turned off, determining signal qualities of the satellite signals, and then selectively changing the target channel selection setting according to the signal qualities.

15. The method of claim 14, wherein the steps of turning on and turning off the correlator channels are performed alternately until the target channel selection setting is changed.

16. The method of claim 9, wherein the target satellite signal includes a plurality of lobes; and the method further comprises determining signal qualities of the lobes, and enabling the target channel selection setting for selecting one of the lobes according to the signal qualities of the lobes.

* * * * *